United States Patent [19]
Taylor et al.

[11] Patent Number: 5,353,586
[45] Date of Patent: Oct. 11, 1994

[54] COMBUSTION CHAMBER ASSEMBLY WITH HOLLOW SUPPORT STRUT FOR CARRYING COOLING AIR

[75] Inventors: David H. Taylor, Warwickshire; Arthur B. Griffin, Leicestershire, both of England

[73] Assignee: Rolls-Royce plc, London, England

[21] Appl. No.: 122,595

[22] PCT Filed: Jan. 6, 1992

[86] PCT No.: PCT/GB92/00017
§ 371 Date: Oct. 1, 1993
§ 102(e) Date: Oct. 1, 1993

[87] PCT Pub. No.: WO92/18760
PCT Pub. Date: Oct. 29, 1992

[30] Foreign Application Priority Data
Apr. 17, 1991 [GB] United Kingdom ............... 9108235.4

[51] Int. Cl.$^5$ ............................................... F02C 3/14
[52] U.S. Cl. ................................... 60/39.37; 60/39.75
[58] Field of Search ................ 60/39.31, 39.32, 39.37, 60/39.75, 39.83, 722, 752, 262

[56] References Cited

U.S. PATENT DOCUMENTS

| | | | |
|---|---|---|---|
| 2,410,450 | 11/1946 | Kroon | 60/39.83 |
| 2,489,692 | 11/1949 | Whittle | 60/39.37 |
| 2,711,072 | 6/1955 | Wetzler | 60/39.37 |
| 3,116,604 | 1/1964 | Holl | 60/39.31 |
| 3,199,294 | 8/1965 | Hagen | 60/39.32 |
| 3,327,473 | 6/1967 | Smith | 60/39.31 |
| 3,650,106 | 3/1972 | Guillot | 60/39.37 |
| 3,756,020 | 9/1973 | Moskowitz et al. | 60/39.75 |
| 4,435,958 | 3/1984 | Klees | 60/262 |
| 4,987,736 | 1/1991 | Ciokajlo et al. | 60/39.32 |
| 5,048,288 | 9/1991 | Bessette et al. | 60/39.75 |
| 5,085,038 | 2/1992 | Todman et al. | 60/39.37 |
| 5,134,855 | 8/1992 | Belcher et al. | |

FOREIGN PATENT DOCUMENTS

| | | |
|---|---|---|
| 0405730 | 2/1991 | European Pat. Off. |
| 1547846 | 11/1968 | France |
| 710862 | 6/1954 | United Kingdom |
| 743633 | 1/1956 | United Kingdom ............... 60/39.37 |
| 1550941 | 8/1979 | United Kingdom |
| 1585157 | 2/1981 | United Kingdom |
| 2149491 | 6/1985 | United Kingdom |
| 2247521 | 3/1992 | United Kingdom |

*Primary Examiner*—Timothy S. Thorpe
*Attorney, Agent, or Firm*—Cushman, Darby & Cushman

[57] ABSTRACT

The smaller diameter end of a first stiff frustoconical casing member (74) is secured to a compressor casing (34) and the smaller diameter end of a second stiff frustoconical casing member (80) is secured to the nozzle guide vanes (40). A plurality of hollow axially extending members (86) are secured to the first and second stiff frustoconical members (74, 80) to transfer tensile and compressive stresses between the compressor casing (34) and the nozzle guide vanes (40). The larger diameter end of the first stiff frustoconical member (74) is secured to an engine casing (52) by a first radially and axially flexible member (88) to define a second chamber (100), and the larger diameter end of the second stiff frustoconical member (80) is secured to the engine casing (52) by a second radially and axially flexible member (94) to define a third chamber (102). The hollow axially extending members (86) define passages (104) to allow cooling air to flow from the first chamber (100) through the second chamber (102) to a turbine. The axially extending members (86) pass circumferentially between adjacent tubular combustion chambers (42) which have their axes arranged radially.

24 Claims, 5 Drawing Sheets

COMBUSTION CHAMBER ASSEMBLY WITH HOLLOW SUPPORT STRUT FOR CARRYING COOLING AIR

This is a 371 of PCT/GB92/00017, filed Jan. 6, 1992.

The present invention relates to combustion chamber assemblies, particularly for gas turbine engines.

Currently many industrial gas turbine engines use annular or can-annular combustion chambers in an axial flow gas turbine engine. In annular and can-annular combustion chamber assemblies, inner and outer annular casings are provided coaxially around the annular, or can-annular, combustion chamber assembly. The inner casing interconnects the compressor casing and the outer platforms of the nozzle guide vanes, to tie the thermal expansion of the compressor casing and the thermal expansion of the nozzle guide vane platforms together to maintain their relative locations, and to enable nozzle guide vane tilt reduction with increasing temperature. The inner casing is secured to the outer casing to provide outer location of the compressor and turbine stator vanes. The inner and outer annular casings also define an annular passageway for the flow of cooling fluid, bled from the compressor, to the turbine.

In order to meet the emission level requirement for low emission industrial gas turbine engines, the combustion chamber volume has been increased. The requirement to increase the volume of the combustion chamber assembly whilst incorporating the combustion chamber assembly in the same axial length has necessitated the use of a plurality of tubular combustion chambers, whose longitudinal axes are arranged in a generally radial direction with respect to the longitudinal axis of the gas turbine engine. The upstream, or inlet, ends of the tubular combustion chambers are at the radially outer end, and transition ducts connect the downstream, or outlet, ends of the tubular combustion chambers with the nozzle guide vanes to discharge the hot combustion gases axially into the turbine section of the gas turbine engine.

Thus the provision of the tubular combustion chambers, whose axes are arranged generally radially with respect to the longitudinal axis of the gas turbine engine, prevents the use of an inner annular casing for interconnecting the compressor casing and the outer platforms of the nozzle guide vanes, to tie the thermal expansion of the compressor casing and the thermal expansion of the nozzle guide vane platforms together to maintain their relative locations, and to enable nozzle guide vane tilt reduction with increasing temperature. Also the provision of an outer location of the compressor and turbine stator vanes and a cooling passage for the flow of cooling fluid to the turbine is prevented.

Accordingly the present invention seeks to provide a combustion chamber assembly comprising a plurality of circumferentially spaced tubular combustion chambers which have their axes arranged generally in a radial direction with respect to a longitudinal axis which overcomes the above mentioned problems.

Accordingly the present invention provides a combustion chamber assembly for a gas turbine engine comprising a plurality of elongate combustion chambers extending generally radially with respect to a longitudinal axis of the gas turbine engine, the radially inner ends of the elongate combustion chambers are arranged to discharge combustion gases into a turbine through an annular array of nozzle guide vanes, a first stiff frustoconical casing member located at the upstream end of the combustion chamber assembly, a second stiff frustoconical casing member connected to the nozzle guide vane array at the downstream end of the combustion chamber assembly, a plurality of hollow members with opposing ends secured to the first and second frustoconical casing members and extending between adjacent ones of the combustion chambers to transfer tensile and compressive stresses through the assembly between the first and second frustoconical casing members, the ends of the hollow members are connected to passage means associated with the frustoconical casing members for the transfer of cooling fluid across the assembly.

Preferably the smaller diameter end of the first frustoconical casing member is secured to the compressor casing.

Preferably the smaller diameter end of the first frustoconical casing member is the upstream end of the first frustoconical casing member.

Preferably the smaller diameter end of the second frustoconical casing member is secured to the combustor outlet guide vanes.

Preferably an annular casing surrounds the first and second frustoconical casing members.

Preferably the smaller diameter end of the second frustoconical casing member is located relative to the annular casing.

Preferably the smaller diameter end of the second frustoconical casing member is located relative to the annular casing by a dogged location.

Preferably the smaller diameter end of the second frustoconical casing member is the downstream end of the second frustoconical casing member.

Preferably a first annular flexible member interconnects the larger diameter end of the first frustoconical casing member and the annular casing.

Preferably a second annular flexible member interconnects the larger diameter end of the second frustoconical casing member and the annular casing.

Preferably the first annular flexible member has at least one portion which has a C shape in longitudinal cross-section.

The second annular flexible member may have at least one portion which has a C shape in longitudinal cross-section.

The present invention also provides a gas turbine engine comprising in flow series compressor means, combustor means and turbine means, the compressor including a compressor casing, the combustor means including a plurality of elongate combustion chambers extending generally radially with respect to a longitudinal axis of the gas turbine engine, the radially inner ends of the elongate combustion chambers are arranged to discharge combustion gases into the turbine means through an annular array of nozzle guide vanes, a first stiff frustoconical casing member connected to the compressor casing at the upstream end of the combustor means, a second stiff frustoconical casing member connected to the nozzle guide vane array at the downstream end of the combustor means, a plurality of hollow members with opposing ends secured to the first and second frustoconical casing members and extending between adjacent ones of the combustion chambers to transfer tensile and compressive stresses through the assembly between the first and second frustoconical casing members, the ends of the hollow members are connected to passage means associated with the frustoconical casing members for the transfer of pressurised cooling fluid across the assembly from the compressor means to the turbine means.

The present invention will be more fully described by way of example, with reference to the accompanying drawings in which.

Figure 1:
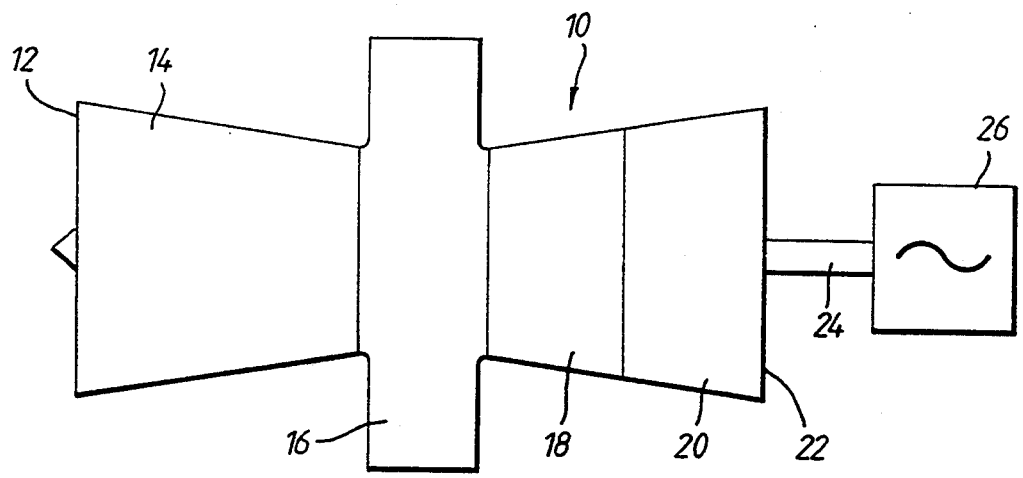
FIG. 1 is a view of a gas turbine engine having a combustion chamber assembly according to the present invention.

An industrial gas turbine engine 10, shown in FIG. 1, comprises in axial flow series an inlet 12, a compressor section 14, a combustion chamber assembly 16, a turbine section 18, a power turbine section 20 and an exhaust 22. The turbine section 18 is arranged to drive the compressor section 14, and the power turbine section 20 is arranged to drive an electrical generator 26, or a mechanical device for example a pump via a shaft 24. The operation of the gas turbine engine 10 is quite conventional, and will not be discussed further.

Figure 2:
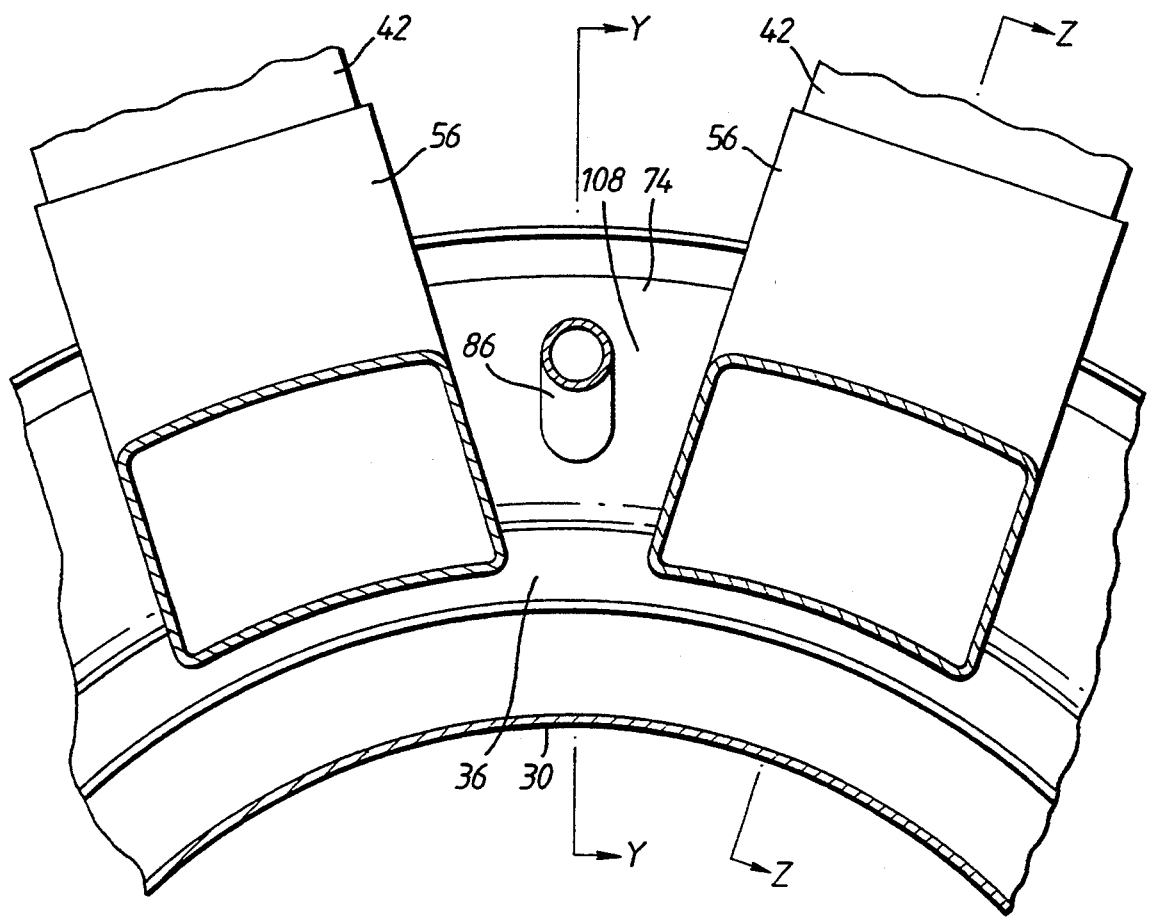
FIG. 2 is a cross-sectional view in the direction of arrows X through the combustion chamber assembly according to the present invention shown in FIG. 3.
Figure 3:
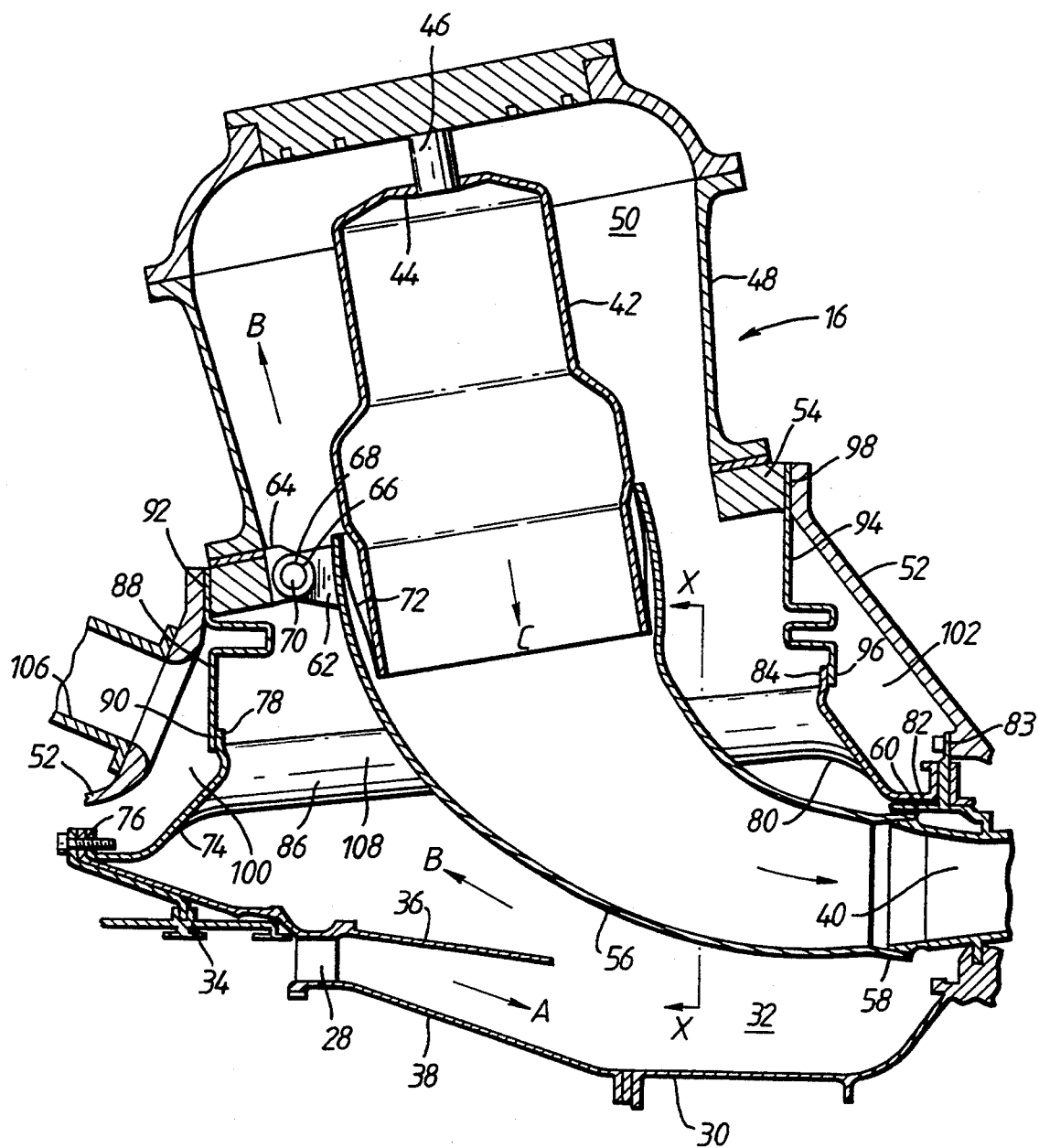
FIG. 3 is a cross-sectional view in the direction of arrows Z through the combustion chamber assembly in FIG. 2.
Figure 4:
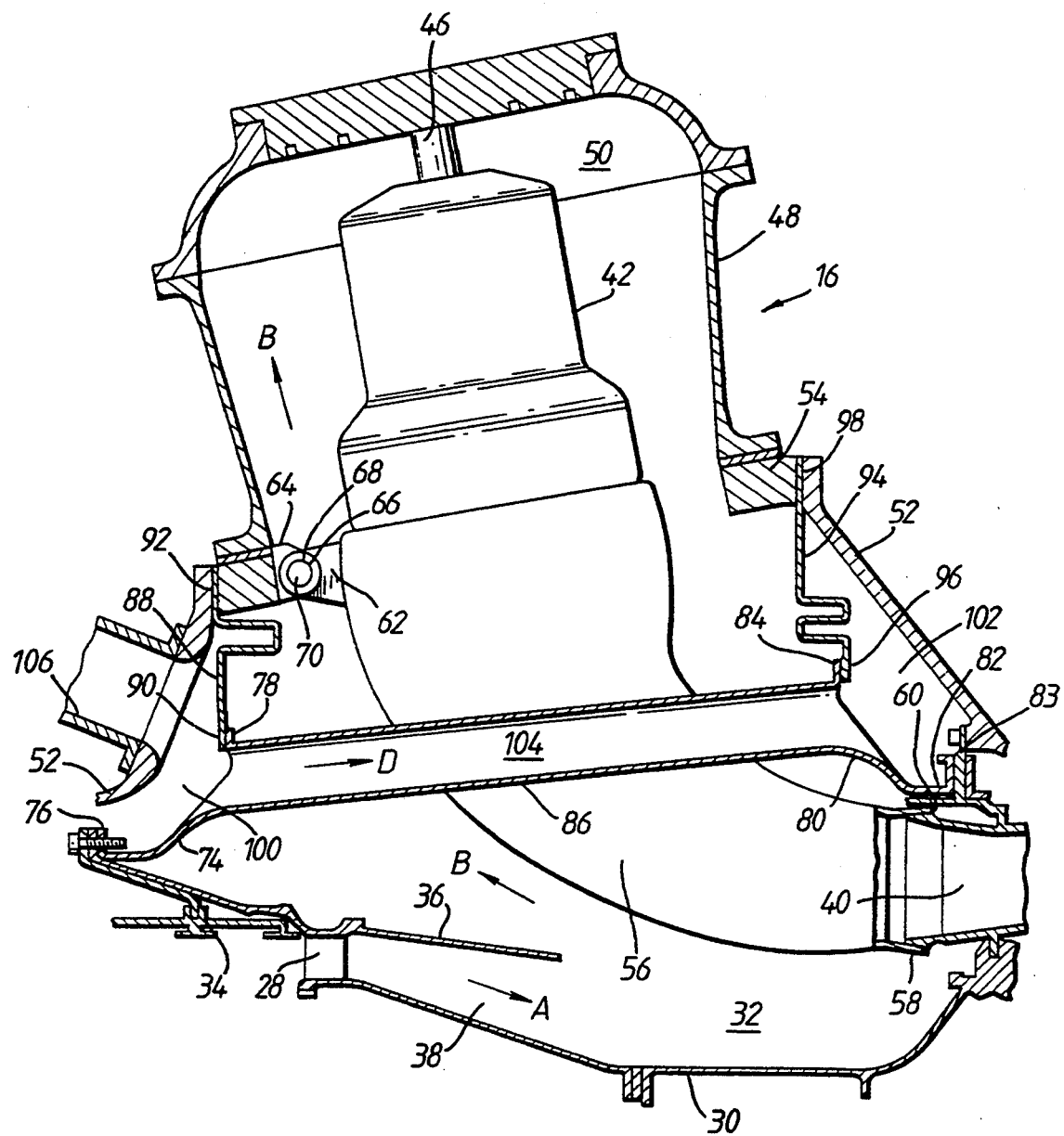
FIG. 4 is a cross-sectional view through the combustion chamber assembly in the direction of arrows Y in FIG. 2.

The combustion chamber assembly 16 is shown more clearly in FIGS. 2, 3 and 4. A plurality of compressor outlet guide vanes 28 are provided at the axially downstream end of the compressor section 14, to which is secured at their radially inner ends an inner annular wall 30 which defines the inner surface of an annular chamber 32. The radially outlet ends of the outlet guide vanes 28 are secured to an annular compressor casing 34, and in this example the downstream end 36 of the annular compressor casing 34 defines a diffuser 38 with the upstream portion of the inner annular wall 30. In some circumstances the downstream end of the annular compressor casing 34 and the inner annular wall 30 need not define a diffuser. The downstream end of the inner annular wall 30 is secured to the radially inner ends of the combustor nozzle guide vanes 40 which direct hot gases from the combustion chamber assembly 16 into the turbine section 18.

The combustion chamber assembly 16 comprises a plurality of equally circumferentially spaced tubular combustion chambers 42. The axes of the tubular combustion chambers 42 are arranged to extend in a generally radial direction, with respect to the longitudinal axis of the gas turbine engine 10. The upstream, inlet, ends of the tubular combustion chambers 42 are at their radially outermost ends and the downstream, outlet, ends are at their radially innermost ends. The upstream end of each of the tubular combustion chambers 42 has an inlet 44 for air and a fuel injector 46. The air inlet 44 may have swirlers in order to impart a swirling motion to the air flowing into the combustion chambers 42. A plurality of cylindrical casings 48 are provided, each cylindrical casing 48 is located coaxially around a respective one of the tubular combustion chambers 42 and each cylindrical casing 48 is secured to a respective boss 54 on the annular engine casing 52. A chamber 50 is formed between each tubular combustion chamber 42 and its respective cylindrical casing 48.

A plurality of equally circumferentially spaced transition ducts 56 are provided, and each of the transition ducts 56 has a circular cross-section at its upstream end. The upstream end of each of the transition ducts 56 is located coaxially with and around the downstream end of a corresponding one of the tubular combustion chambers 42, and each of the transition ducts 56 connects and seals with an angular section of the nozzle guide vanes 40. The downstream end of each transition duct 56 has single walls 58, at its radially inner and outer extremities, which are a sliding fit on the surfaces of the radially inner and outer platforms 60 of the nozzle guide vanes 40. The radially inner walls 58 locate radially inwardly of the inner platform 60, and the radially outer walls 58 locate radially outwardly of the outer platform 60.

The upstream end of each transition duct 56 has a bracket 62 which extends radially outwardly, with respect to the upstream end of the transition duct, and the annular engine casing 52 has a plurality of pairs of brackets 64. A pin 70 passes through coaxial apertures 66 and 68 in the brackets 62 and 64 respectively to pivotally mount the upstream end of the transition duct 56 to the annular engine casing 52. A resilient sealing ring 72 is positioned between the downstream end of each of the tubular combustion chambers 42 and the upstream end of its respective transition duct 56 to allow relative movement between the downstream end of each tubular combustion chamber 42 and the upstream end of the associated transition duct 56. The pivotal mounting and sealing arrangement is described more fully in our copending UK patent application No. 9019089.3 filed Sep. 1, 1990 (GB2247521 published on Mar. 4, 1992).

A first stiff frustoconical casing member 74 is positioned axially upstream of the tubular combustion chambers 42 and the first stiff frustoconical casing member 74 surrounds the downstream end of the compressor casing 34. The upstream end 76 of the first stiff frustoconical casing member 74 has the smaller diameter and the upstream end 76 of the first stiff frustoconical casing member 74 is flanged and is secured to the compressor casing 34 by a bolted, or other suitable, joint.

A second stiff frustoconical casing member 80 is positioned axially downstream of the tubular combustion chambers 42 and the second stiff frustoconical casing member 80 surrounds the combustor nozzle guide vanes 40. The downstream end 82 of the second stiff frustoconical casing member 80 has the smaller diameter and the downstream end 82 of the second stiff frustoconical casing member 80 is flanged and is secured to the nozzle guide vanes 40 by a bolted, or other suitable, joint. The downstream end 82 of the second stiff frustoconical casing member 80 is also located relative to the annular engine casing 52 by dogged, or other suitable, locating features 83 on the outer engine casing 52 and the second stiff frustoconical casing member 80.

A plurality of equally circumferentially spaced axially extending hollow members 86 are provided. The upstream end of each axially extending hollow member 86 is secured to the downstream end 78 of the first stiff frustoconical casing member 74 and the downstream end of each axially extending hollow member 86 is secured to the upstream end 84 of the second stiff frustoconical casing member 80. Each axially extending hollow member 86 is arranged to pass circumferentially between adjacent tubular combustion chambers 42. The provision of the first and second stiff frustoconical casing members 74 and 80 and the axially extending hollow members 86 enables tensile and compressive stresses to be transferred between the compressor casing 34 and the nozzle guide vanes 40. This enables the thermal expansion of the compressor casing 34 and the thermal expansion of the nozzle guide vanes 40 to be tied together to maintain relative locations and enable nozzle guide vane tilt reductions with increasing temperature. The downstream end 82 of the second stiff frustoconical casing member 80 has a dogged location relative to the outer engine casing 52 to provide the outer location of the compressor and turbine stator vanes. The axially extending hollow members 86 allow the flow of cooling air bled from the compressor 14 to be supplied to the turbine 18.

A first annular flexible member 88 has a flanged radially inner end 90, which is secured to the flanged downstream end 78 of the first stiff frustoconical casing member 74, and a flanged radially outer end 92, which is secured to the annular engine casing 52. The first annular flexible member 88 has an appropriate shape to give radial and axial flexibility to allow for differential thermal expansion between the compressor casing 34 and the annular engine casing 52. In this example the first annular flexible member 88 has a portion which is C shaped in longitudinal cross-section to give the radial and axial flexibility. A second annular flexible member 94 has a flanged radially inner end 96, which is secured to the flanged upstream end 84 of the second stiff frustoconical casing member 80, and a flanged radially outer end 98, which is secured to the annular engine casing 52. The second annular flexible member 94 has an appropriate shape to give radial and axial flexibility to allow for differential thermal expansion between the nozzle guide vanes 40 and the annular engine casing 52. In this example the second annular flexible member 94 has two portion which are C shaped in longitudinal cross-section but which face in opposite axial directions.

The compressor casing 34, the first stiff frustoconical casing member 74, the first annular flexible member 88 and the annular engine casing 52 define a second annular chamber 100. The second stiff frustoconical casing member 80, the second annular flexible member 94 and the annular engine casing 52 define a third annular chamber 102. The axially extending hollow members 86 define passages 104 which interconnect the second and third annular chambers 100 and 102. The annular engine casing 52 may have one or more bleed off take ducts 106 for supplying compressed air from the second annular chamber 100 for other purposes. The first stiff frustoconical casing member 74, the first annular flexible member 88, the second stiff frustoconical casing member 80, the second annular flexible member 94 and the axially extending hollow members 86 define passages 108 for the flow of air from the annular chamber 32 to the chambers 50.

In operation compressed air supplied from the compressor section 14 is discharged, axially in the direction of arrows A, from the outlet guide vanes 28, and is diffused into the annular chamber 32. The compressed air then flows radially outwards following the arrows B through the passages 108 into the chambers 50 between the tubular combustion chambers 42 and the cylindrical casings 48. A portion of the air flows into the tubular combustion chambers 42 to allow the fuel to be burnt, and the remainder is used to cool the combustion chambers. The hot gases produced in the tubular combustion chambers 42 flow through the transition ducts 56 following the arrows C to flow through the nozzle guide vanes 40 into the turbine section 18.

Compressed air bled from the compressor section 14 is supplied into the second annular chamber 100. A portion of the compressed air is supplied from the second annular chamber 100 to the third annular chamber 102 through the passages 104 in the axially extending hollow members 86. The compressed air in the third annular chamber 102 is used to cool the turbine section 18. Compressed air may also be supplied from the second annular chamber 100 for other purposes through the bleed off take ducts 106.

The first and second stiff frustoconical casing members 74 and 80 and the axially extending hollow members 86 interconnect the compressor casing 34 and the nozzle guide vanes 40 to transfer tensile and compressive stresses therebetween, in order tie the thermal expansion of the compressor casing 34 and the thermal expansion of the nozzle guide vanes 40 together. The downstream end of the second stiff frustoconical casing member 80 has a dogged location with the outer engine casing 52 to provide an outer location for the compressor and turbine stator vanes.

Figure 5:
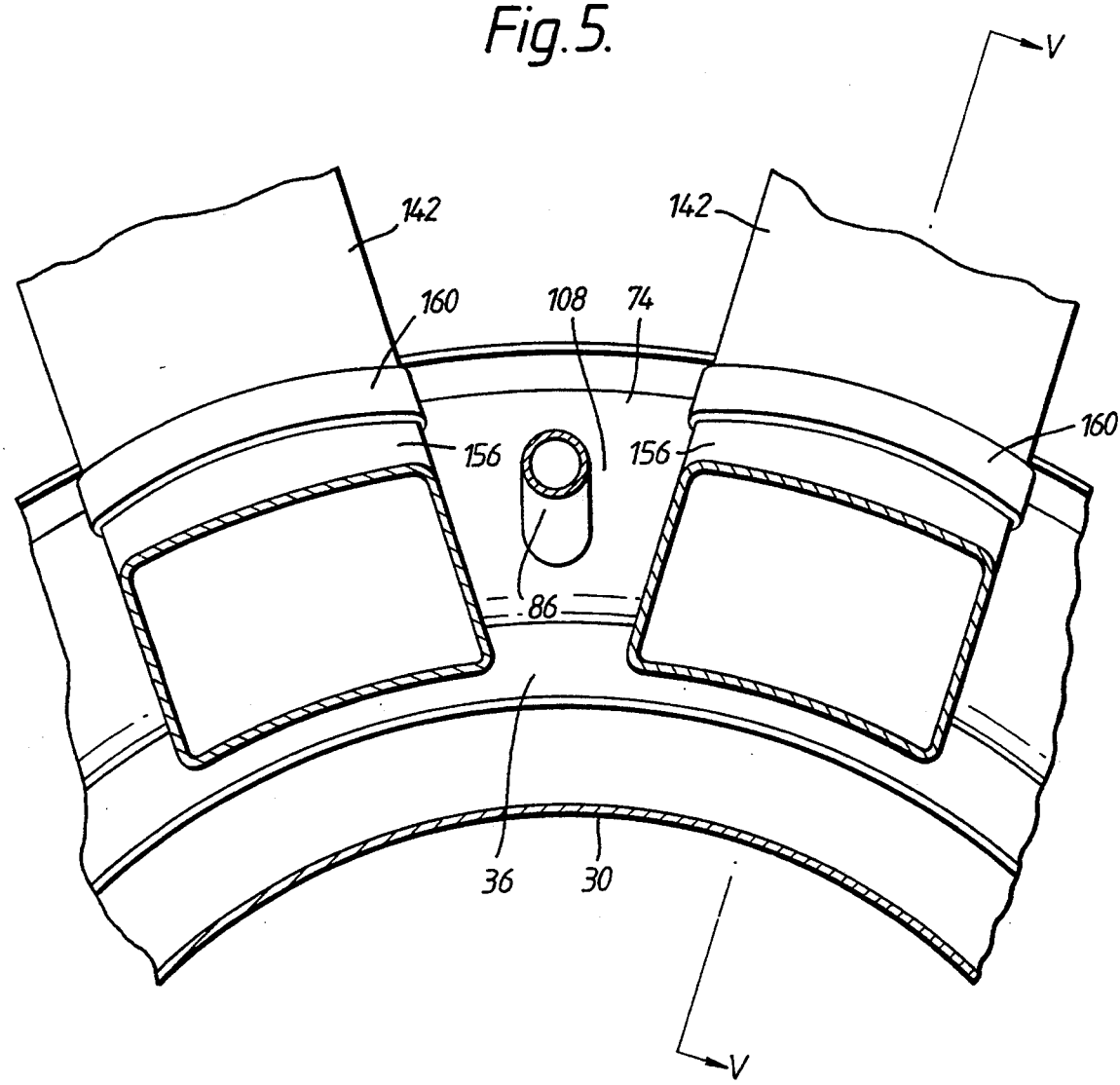
FIG. 5 is a cross-sectional view in the direction of arrows W through an alternative combustion chamber assembly according to the present invention shown in FIG. 6.
Figure 6:
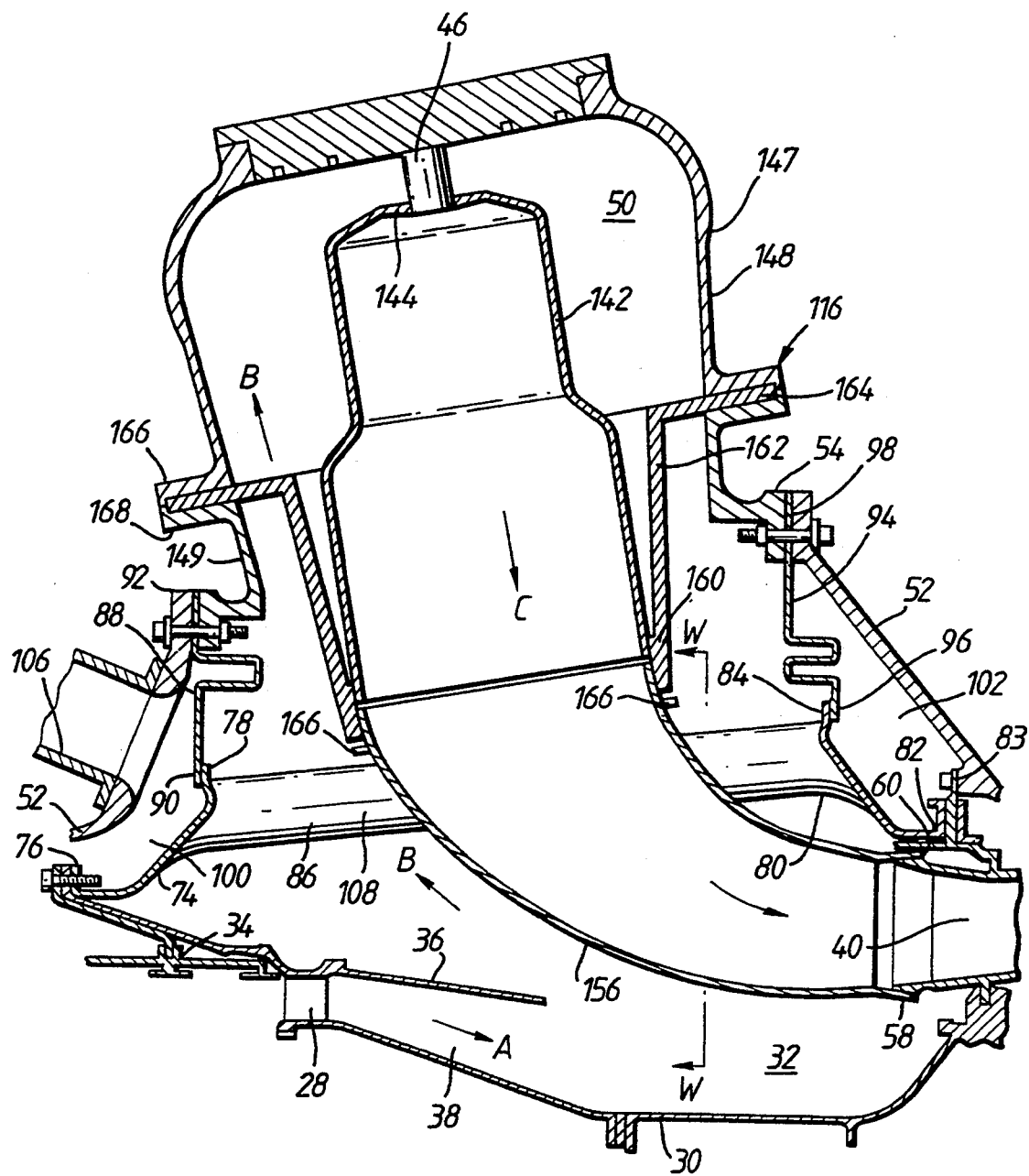
FIG. 6 is a cross-sectional view in the direction of arrows V through the combustion chamber assembly in FIG. 5.

An alternative combustion chamber assembly 116, shown in FIGS. 5 and 6, is substantially the same as the embodiment shown in FIGS. 2 to 4. This embodiment differs in the manner of mounting the upstream end of the transition ducts 156 to the annular engine casing 52, and in the manner of allowing relative movement between the downstream end of the tubular combustion chamber 142 and the upstream end of the transition duct 156. The upstream end of each of the transition ducts 156 is arranged coaxially with the downstream end of a corresponding one of the tubular combustion chambers 142. The upstream end of each of the transition ducts 156 is axially slidably mounted in a corresponding tubular member 160 which has a circular bore therethrough. The tubular member 160 is mounted to the corresponding cylindrical casing 148 by a pair of A-frame support members 162 which are secured to a ring 164. The ring 164 is trapped between flanges 166 and 168 of first and second parts 147 and 149 respectively of the respective cylindrical casing 148. The downstream end of each tubular combustion chamber 142 is also axially slidably mounted in the circular bore through the corresponding tubular member 160. The A-frame support members 162 are provided with apertures not shown to allow the flow of air from the chamber 32 to the chambers 50 and the upstream end of the tubular combustion chambers 142. The upstream end of the transition ducts 156 are provided with a number of pins 166 which limit the amount of relative axial movement between the transition ducts 156 and the tubular members 160.

Although the description and drawings have referred to an axially flow gas turbine engine the present invention may be used on a radial flow gas turbine engine.

We claim:

1. A combustion chamber assembly (16) for a gas turbine engine (10) comprising a plurality of elongate combustion chambers (42) extending generally radially with respect to a longitudinal axis of the gas turbine engine (10) the radially inner ends of the elongate combustion chambers (42) are arranged to discharge combustion gases into a turbine (18, 20) through an annular array of nozzle guide vanes (40), characterised in that a first stiff frustoconical casing member (74) is located at the upstream end of the combustion chamber assembly (16), a second stiff frustoconical casing member (80) is connected to the nozzle guide vane array (40) at the downstream end of the combustion chamber assembly (16), a plurality of hollow members (86) with opposing ends secured to the first and second frustoconical casing members (74, 80) and extending between adjacent ones of the combustion chambers (42) to transfer tensile and compressive stresses through the assembly between the first and second frustoconical casing members (74, 80), the ends of the hollow members (86) are connected to passage means (100, 102) associated with the frustoconical casing members (74, 80) for the transfer of pressurised cooling fluid across the assembly.

2. A combustion chamber assembly as claimed in claim 1 in which the smaller diameter end (76) of the first frustoconical casing member (74) is secured to a compressor casing (34).

3. A combustion chamber assembly as claimed in claim 1 in which the smaller diameter end (76) of the first frustoconical casing member (74) is the upstream end of the first frustoconical casing member (74).

4. A combustion chamber assembly as claimed in claim 1 in which the smaller diameter (82) end of the second frustoconical casing member (80) is secured to the combustor outlet guide vanes (40).

5. A combustion chamber assembly as claimed in claim 1, in which the smaller diameter end (82) of the second frustoconical casing member (80) is the downstream end of the second frustoconical casing member (80).

6. A combustion chamber assembly as claimed in claim 1 in which an annular casing (52) surrounds the first and second frustoconical casing members (74, 80).

7. A combustion chamber assembly as claimed in claim 6 in which the smaller diameter end (82) of the second frustoconical casing member (80) is located relative to the annular casing (52).

8. A combustion chamber assembly as claimed in claim 7 in which the smaller diameter end (82) of the second frustoconical casing member (80) is located relative to the annular casing (52) by a dogged location (83).

9. A combustion chamber assembly as claimed in claim 6 in which a first annular flexible member (88) interconnects the larger diameter end (78) of the first frustoconical member (74) and the annular casing (52).

10. A combustion chamber assembly as claimed in claim 6, in which a second annular flexible member (94) interconnects the larger diameter end (84) of the second frustoconical casing member (80) and the annular casing (52).

11. A combustion chamber assembly as claimed in claim 9 in which the first annular flexible member (88) has at least one portion which has a C shape in longitudinal cross-section.

12. A combustion chamber assembly as claimed in claim 10 in which the second annular flexible member (94) has at least one portion which has a C shape in longitudinal cross-section.

13. A gas turbine engine (10) comprising in flow series compressor means (14), combustor means (16) and turbine means (18, 20), the compressor (14) including a compressor casing (34), the combustor means (16) including a plurality of elongate combustion chambers (42) extending generally radially with respect to a longitudinal axis of the gas turbine engine (10), the radially inner ends of the elongate combustion chambers (42) are arranged to discharge combustion gases into the turbine means (18, 20) through an annular array of nozzle guide vanes (40), characterised in that a first stiff frustoconical casing member (74) is connected to the compressor casing (34) at the upstream end of the combustor means (16), a second stiff frustoconical casing member (80) is connected to the nozzle guide vane array (40) at the downstream end of the combustor means (16), a plurality of hollow members (86) with opposing ends secured to the first and second frustoconical casing members (74, 80) and extending between adjacent ones of the combustion chambers (42) to transfer tensile and compressive stresses through the assembly between the first and second frustoconical casing members (74, 80), the ends of the hollow members (86) are connected to passage means (100, 102) associated with the frustoconical casing members (74, 80) for the transfer of pressurised cooling fluid across the assembly from the compressor means (14) to the turbine means (18, 20).

14. A gas turbine engine as claimed in claim 13 in which the smaller diameter end (76) of the first frustoconical casing member (74) is secured to the compressor casing (34).

15. A gas turbine engine as claimed in claim 14 in which the smaller diameter end (76) of the first frustoconical casing member (74) is the upstream end of the first frustoconical casing member (74).

16. A gas turbine engine as claimed in claim 13 in which the smaller diameter end (82) of the second frustoconical casing member (80) is secured to the combustor outlet guide vanes (40).

17. A gas turbine engine as claimed in claim 16 in which the smaller diameter end (82) of the second frustoconical casing member (80) is the downstream end of the second frustoconical casing member (80).

18. A gas turbine engine as claimed in claim 13 in which an annular casing (52) surrounds the first and second frustoconical casing members (74, 80).

19. A gas turbine engine as claimed in claim 18 in which the smaller diameter end (82) of the second frustoconical casing member (80) is located relative to the annular casing (52).

20. A gas turbine engine as claimed in claim 19 in which the smaller diameter end (82) of the second frustoconical casing member (80) is located relative to the annular casing (52) by a dogged location (83).

21. A gas turbine engine as claimed in claim 18 in which a first annular flexible member (88) interconnects the larger diameter end (78) of the first frustoconical casing member (74) and the annular casing (52).

22. A gas turbine engine as claimed in claim 21 in which the first annular flexible member (88) has at least one portion which has a C shape in longitudinal cross-section.

23. A gas turbine engine as claimed in claim 18 in which a second annular flexible member (94) interconnects the larger diameter end (84) of the second frustoconical casing member (80) and the annular casing (52).

24. A gas turbine engine as claimed in claim 23 in which the second annular flexible member (94) has at least one portion which has a C shape in longitudinal cross-section.

* * * * *